United States Patent
Ostin

(10) Patent No.: US 7,156,025 B2
(45) Date of Patent: Jan. 2, 2007

(54) METHOD FOR CONTROLLING THE BURNING PRESSURE IN A PREINFLATOR, PREINFLATOR PER SE AND HYBRID GAS GENERATOR INCORPORATING SUCH A PREINFLATOR

(75) Inventor: Thorbjorn Ostin, Karlskoga (SE)

(73) Assignee: Autoliv Development AB (SE)

( * ) Notice: Subject to any disclaimer, the term of this patent is extended or adjusted under 35 U.S.C. 154(b) by 448 days.

(21) Appl. No.: 10/466,420

(22) PCT Filed: Dec. 17, 2001

(86) PCT No.: PCT/SE01/02792

§ 371 (c)(1),
(2), (4) Date: Oct. 22, 2003

(87) PCT Pub. No.: WO02/057703

PCT Pub. Date: Jul. 25, 2002

(65) Prior Publication Data

US 2005/0250059 A1    Nov. 10, 2005

(30) Foreign Application Priority Data

Jan. 19, 2001    (SE) .................................. 0100150

(51) Int. Cl.
*B60R 21/26* (2006.01)
*B60R 21/272* (2006.01)

(52) U.S. Cl. ....................... 102/530; 280/737; 280/742

(58) Field of Classification Search ................ 102/531, 102/530; 280/736, 737, 741, 742, 738
See application file for complete search history.

(56) References Cited

U.S. PATENT DOCUMENTS

| 3,723,205 A |   | 3/1973  | Scheffee |
| 4,200,615 A |   | 4/1980  | Hamilton et al. |
| 4,380,346 A |   | 4/1983  | Davis et al. |
| 4,886,293 A |   | 12/1989 | Weiler |
| 5,056,815 A |   | 10/1991 | Geisreiter |
| 5,116,080 A | * | 5/1992  | Wipasuramonton ......... 280/741 |

(Continued)

FOREIGN PATENT DOCUMENTS

EP    0 783 997    8/2004

(Continued)

*Primary Examiner*—Michael J. Carone
*Assistant Examiner*—James S. Bergin
(74) *Attorney, Agent, or Firm*—Connolly Bove Lodge & Hutz, LLP; Larry J. Hume

(57) ABSTRACT

The present invention relates to a method and a device for making the combustion of a pyrotechnic compostion independent of the ambient temperature when combusting a pyrotechnic composition in a preinflator or combustion chamber (2) incorporating outlets but being otherwise enclosed. As claimed in the present invention this is enabled by controlling the burning pressure of the pyrotechnic composition so that it does not exceed a predetermined value. The characteristic feature of the present invention is that the preinflator (2), in which combustion of the pyrotechnic composition takes place, incorporates a plurality of gas discharge perforations (6–9) or outlets, each of which is initially sealed by a bursting disc or foil seal (10) that is designed to rupture when the said burning pressure in the combustion chamber (2) is exceeded.

7 Claims, 1 Drawing Sheet

U.S. PATENT DOCUMENTS

| | | | |
|---|---|---|---|
| 5,269,561 A * | 12/1993 | Davis et al. | 280/736 |
| 5,471,932 A * | 12/1995 | Kraft et al. | 102/531 |
| 5,772,238 A * | 6/1998 | Breed et al. | 280/728.2 |
| 6,168,199 B1 * | 1/2001 | Faigle | 280/736 |
| 6,199,905 B1 * | 3/2001 | Lewis | 280/737 |
| 6,206,418 B1 | 3/2001 | Perotto et al. | |
| 6,540,256 B1 * | 4/2003 | Iwai et al. | 280/736 |
| 6,634,302 B1 * | 10/2003 | Rink et al. | 102/530 |

FOREIGN PATENT DOCUMENTS

| | | |
|---|---|---|
| FR | 2752293 | 2/1998 |
| GB | 2279442 | 1/1995 |

* cited by examiner

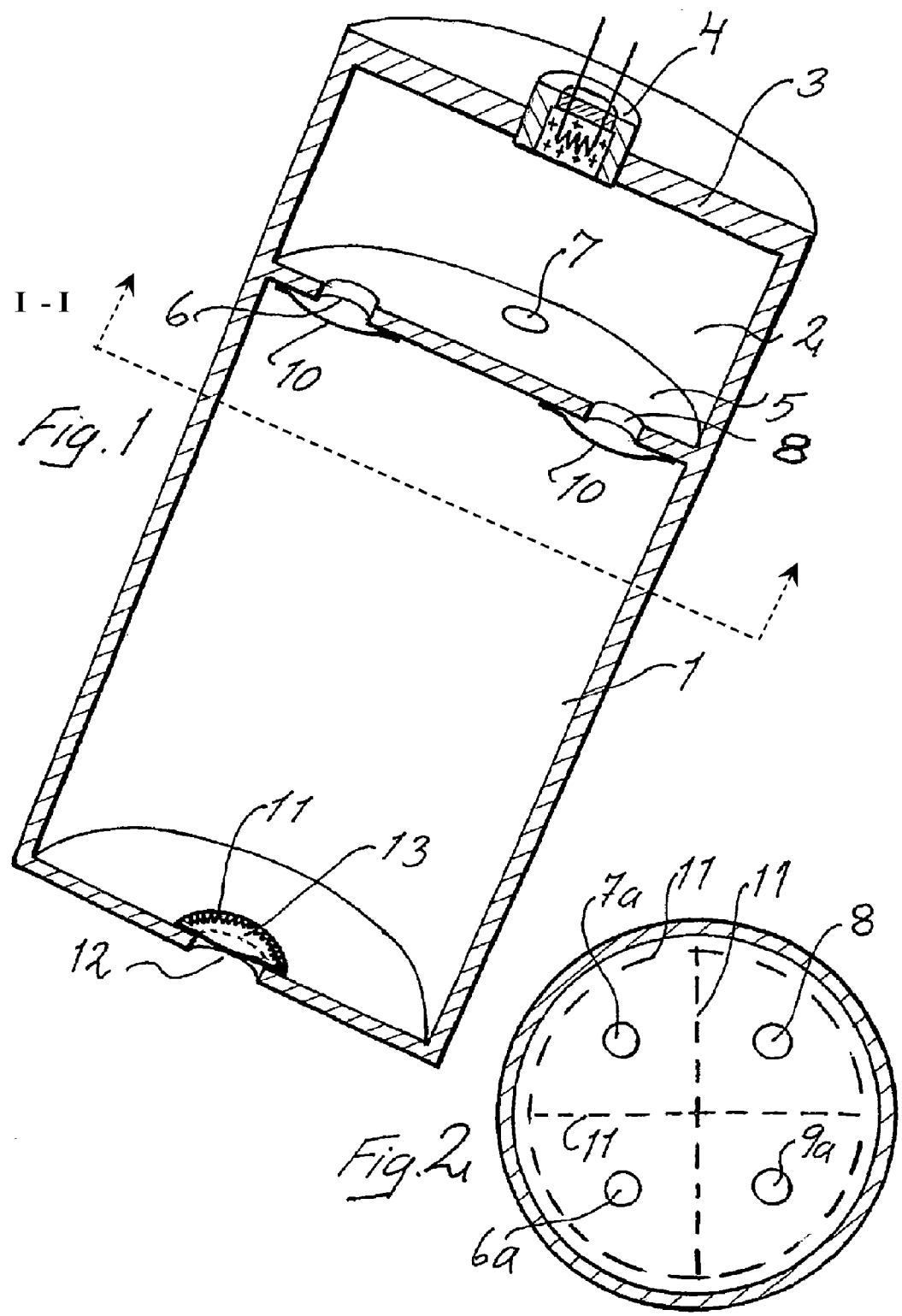

METHOD FOR CONTROLLING THE BURNING PRESSURE IN A PREINFLATOR, PREINFLATOR PER SE AND HYBRID GAS GENERATOR INCORPORATING SUCH A PREINFLATOR

BACKGROUND

The present invention relates to a temperature insensitive inflator, or gas generator, of pressurised gas or hybrid type. The present invention also includes a method of controlling the burning pressure without moving parts, thereby controlling the burning rate and generation of gas in the preinflator incorporated, which thus controls the emission of gas from the hybrid gas generator.

The burning rate for all types of pyrotechnic composition, or solid gas generant composition, is more or less temperature and pressure dependant, which entails certain problems in devices driven by pyrotechnic compositions that are expected to function in all sorts of climates and temperature ranges. Controlling the pressure in a pyrotechnic composition combustion chamber by means of a spring balanced outlet valve is admittedly fairly simple, but it requires the introduction of movable mechanical parts that must function faultlessly and immediately, perhaps after a long period of storage.

SUMMARY

The present invention now relates to a method utilising no movable parts for controlling the burning pressure and thereby the burning rate in a pyrotechnic composition combustion chamber or preinflator, primarily such a type as is incorporated in a pyrotechnic composition driven pressurised gas generator or hybrid gas generator. By controlling the burning pressure in the pyrotechnic composition combustion chamber or preinflator one also controls the total gas emission from the inflator even when it is of hybrid type. The device as claimed in the present invention provides even gas production independent of the ambient temperature during virtually the entire burning duration of the preinflator incorporated.

The hybrid gas generator design as claimed in the present invention supplies a relatively cool gas making it particularly suitable as a gas supplier in automobile safety parts such as, for example, active vehicle accident protectors of airbag type.

In its most preferred embodiment the device as claimed in the present invention comprises a pressure vessel containing an active or inert gas under high pressure, plus a pyrotechnic composition combustion chamber or preinflator that is united with the pressure vessel via a plurality of initially sealed perforations for discharging gas. Each of the perforations for discharging gas is sealed by a bursting disc or foil seal that is dimensioned and designed with an adequate margin to resist the gas pressure inside the pressure vessel and to open when the pressure in the preinflator after ignition exceeds a predetermined value. This predetermined value subsequently constitutes the internal pressure that applies for the preinflator during its active burning duration from ignition until immediately before it is fully burnt-out. During ignition of the preinflator nothing active occurs until the said predetermined pressure is reached when first one, and successively thereafter as required, a number of the said gas discharge perforations open and thereby restrict the burning pressure inside the preinflator to the predetermined value. If the burning pressure increases further, additional gas discharge perforations in the pressure vessel open. The pressure vessel incorporated in the device as claimed in the present invention in turn incorporates an outlet that is similarly sealed by a foil seal or bursting disc and that leads to the designated gas consumer, and which outlet is in turn opened by the preinflator gases flowing into the pressure vessel, either in the form of a thus formed shock wave or by the thereby enhanced gas pressure.

The advantages of the device as claimed in the present invention are obvious as there are no moving parts, nor parts that have to be adjusted, in the system—instead, it consists of fixed parts dimensioned once and for all.

By employing foil seals to seal the gas discharge perforations and selecting on which side of the dividing wall between the preinflator and the pressure vessel to locate the foil seals, and by welding them onto the dividing wall at a predetermined distance from the edge of each perforation, one can seal the perforations such that the size of the seal surface subjected to load is different in each direction and can thus withstand an overpressure of different magnitude in each direction. The surface subjected to load on the foil side is the same as the area of the gas discharge perforation, while the surface subjected to load from the opposite direction is the same as the area of the foil inside the weld that is accessible through the relevant gas discharge perforation.

The present invention now makes it possible to manufacture hybrid gas generators whose internal pressure and gas discharge can be selected within very wide limits by variation of the parameters involved, especially the size of the preinflator and the type of pyrotechnic composition therein, the size of the pressure vessel and the gas and gas pressure therein, the size and number of gas discharge perforations, the thickness and strength of the foil seal(s) and on which side of the dividing wall between the preinflator and pressure vessel the foil seal(s) is/are mounted, and how far from the edges of the perforations the foil seal(s) is/are welded.

When selecting the pressure inside the combustion chamber of the preinflator the constraint that generally applies is that the pyrotechnic composition must have a greater burning pressure than its own burning pressure at atmospheric pressure and the lowest temperature at which the pyrotechnic composition can be expected to be used.

The resistance of a bursting disc or foil seal to the pressure in the inner chamber shall also be adapted such that each rise in pressure above the predetermined value results in one or more of the perforations being liberated to enable gas discharge. As long as there are more sealed perforations available one can rely on one of them always being slightly weaker than the others and consequently opening first. We have not been able to ascertain any tendency at all for several or all of the gas discharge perforations to open simultaneously, such as at the start of a preinflator.

By precisely determining the number and size of the perforations, and by selecting the strength and load surface area of the foil seal or bursting disc used to seal the said perforations, it is thus easy to gradually reduce the burning pressure in the preinflator to the desired value.

The present invention thus offers a very elementary method and very elementary device for combusting pyrotechnic compositions that are pressure and temperature sensitive at constant pressure within a very wide temperature range.

The device as claimed in the present invention can be used in various types of gas generators or inflators, such as those used in automobile safety components, rocket motors etc.

BRIEF DESCRIPTION OF THE DRAWINGS

The present invention is defined in the subsequent Patent Claims, and shall now be described in further detail with reference to the appended figures in which FIG. 1 shows a longitudinal section of a device as claimed in the present invention, and FIG. 2 shows a cross-section of the device at the position designated I—I on FIG. 1.

The device illustrated in FIG. 1 comprises a pressure vessel 1 containing a gas under high pressure. The gas preferably has sufficient oxygen content so that when the device is actuated the carbon monoxide formed from combustion of the pyrotechnic composition can be converted to carbon dioxide. There is a pyrotechnic gas generator or preinflator 2 conjoined with pressure vessel 1. Initially, the greater part of this is filled with loose pyrotechnic composition that is not illustrated in the figure. The back end 3 of the preinflator 2 incorporates an electric igniter 4. In the example illustrated in the figure there are four gas discharge perforations 6–9 arranged in the dividing wall 5 between the preinflator 2 and the pressure vessel 1. Of these, perforations 6–8 are shown on the figure. Even if the figure shows a preinflator with only four gas discharge perforations, the number of gas discharge perforations as well as their mutual and combined areas can be varied within the limits that provide the desired burning pressure in the combustion chamber of the preinflator. On the pressure vessel side the gas discharge perforations 6–9 are sealed by foil seals 10 which, as indicated on the figure, are welded to the dividing wall 5 all around each gas discharge perforation at a distance from the edge of each said perforation. This means that the pressurised gas exerts a load on each foil seal corresponding to the cross-sectional area of each gas discharge perforation, whereas the pressure generated by the pyrotechnic composition when the preinflator is initiated exerts a load on the whole area of the foil seal inside the weld that is accessible through each gas discharge perforation.

FIG. 2 shows a variant of the method wherein one unitary foil seal is welded in a way that provides even greater differences in the surface area load on the seal depending on from which direction the load is exerted. On this figure the gas discharge perforations are designated 6a–9a and the welds are generally designated 11.

DETAILED DESCRIPTION

A gas discharge outlet 12 is arranged in the free end of the pressure vessel 1. This is sealed by a foil seal 13 welded onto the inside of the pressure vessel 1 around the gas discharge outlet 12. The weld here is also designated 11. Because the foil seal 13 is located on the inside of the pressure vessel 1, i.e. on the high pressure side, it is the area of the gas discharge outlet 12 that determines the area of the foil seal that is subjected to load.

In initial mode the pressure vessel 1 is filled with a gas, which is rich in oxygen, pressurised to maybe 2–300 bar, while the preinflator 2 contains an appropriate type of loose powdered pyrotechnic composition. When the electric igniter 4 initiates the said pyrotechnic composition the pressure in the preinflator 2 rises to a predetermined overpressure, and as soon as this overpressure level is exceeded the foil seals 10 rupture one at a time as required such that one or more of the gas discharge perforations 6–9 is/are opened. The number of gas discharge perforations that open is dependent on the rise in pressure in the preinflator, and thereby by the burning rate of the pyrotechnic composition. The burning rate of the pyrotechnic composition in the initial stage is in turn determined by the ambient temperature. When the gas generated by the pyrotechnic composition flows into the pressure vessel 1 the pressure therein is raised so that foil seal 13 ruptures while, simultaneously, the carbon monoxide formed by combustion of the pyrotechnic composition reacts with the oxygen content of the pressurised gas to form carbon dioxide. The gas that flows out of the complete hybrid gas generator or inflator through outlet 12 is relatively cool, and is supplied as long as there is pyrotechnic composition remaining for combustion at an even pressure predetermined by the internal dimensions of the device. If the burning pressure in the preinflator increases, another gas discharge perforation opens. The complete device shall thus be so dimensioned that no further gas discharge perforation is necessary, since preferably there shall always be an extra one that never needs to be used.

What is claimed is:

1. A method for controlling, without moving parts during operation, a burning pressure of a pyrotechnic composition used in a hybrid gas generator, the method comprising:
    providing a pressure vessel containing a pressurized gas comprising oxygen therein;
    arranging, within the pressure vessel, a combustion chamber containing the pyrotechnic composition;
    sealing a plurality of gas discharge openings between the combustion chamber and the pressure vessel, wherein each of the plurality of sealed gas discharge openings are dimensioned and designed to rupture in response to different burning pressures within the combustion chamber;
    controlling the burning pressure in the combustion chamber so that it does not exceed a predetermined value by progressively rupturing one or more of the plurality of sealed gas discharge openings;
    passing a combustion gas from the combustion chamber to the pressure vessel through one or more of the gas discharge openings, wherein, by controlling the burning pressure, a burning rate of the pyrotechnic composition is made to be independent of an ambient temperature.

2. The method of claim 1, further comprising reacting, in the pressure vessel, carbon monoxide contained in the passed combustion gas with oxygen in the pressurized gas so as to form carbon dioxide.

3. The method of claim 1, wherein said sealing a plurality of gas discharge openings comprises varying one or more dimensions of each of a plurality of seals so that one specific seal always ruptures before another seal of the plurality of seals.

4. The method of claim 1, wherein said sealing a plurality of gas discharge openings comprises providing a plurality of seals each having an inherent strength that is predetermined in relation to a desired burning pressure in the combustion chamber.

5. The method of claim 1, further comprising sealing a gas discharge outlet connected to the pressure vessel with an outlet seal that is dimensioned and designed to rupture when a pressure within the pressure vessel exceeds a desired value.

6. The method of claim 5, further comprising rupturing the outlet seal and passing gas in the pressure vessel to a gas consumer.

7. The method of claim 6, wherein the gas passed to a gas consumer from the pressure vessel is relatively cooler than combustion gas in the combustion chamber.

* * * * *